United States Patent
Todd et al.

(10) Patent No.: US 9,619,550 B1
(45) Date of Patent: Apr. 11, 2017

(54) COMPUTING RESOURCE RE-PROVISIONING DURING DATA ANALYTIC LIFECYCLE

(71) Applicant: EMC Corporation, Hopkinton, MA (US)

(72) Inventors: Stephen Todd, Shrewsbury, MA (US); David Dietrich, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 240 days.

(21) Appl. No.: 14/290,452

(22) Filed: May 29, 2014

(51) Int. Cl.
G06F 17/30 (2006.01)

(52) U.S. Cl.
CPC .............................. G06F 17/30595 (2013.01)

(58) Field of Classification Search
USPC .................................................. 707/719, 758
See application file for complete search history.

(56) References Cited

U.S. PATENT DOCUMENTS

| | | | | |
|---|---|---|---|---|
| 8,307,080 B2 * | 11/2012 | Cormode | ............. | H04L 43/024 707/758 |
| 8,417,715 B1 * | 4/2013 | Bruckhaus | ........ | G06F 17/30994 705/26.1 |
| 8,478,629 B2 * | 7/2013 | Apte | ...................... | G06Q 10/06 703/2 |
| 8,543,554 B1 * | 9/2013 | Singh | .................. | G06F 17/3048 370/389 |
| 8,612,439 B2 * | 12/2013 | Prahlad | ............... | G06F 17/3002 707/640 |
| 8,694,519 B2 * | 4/2014 | Fein | .................... | G06Q 30/0205 707/706 |
| 2013/0332935 A1 * | 12/2013 | Varma | .................... | G06F 9/5011 718/104 |
| 2015/0134386 A1 * | 5/2015 | Jogalekar | ....... | G06Q 10/063118 705/7.13 |
| 2015/0310195 A1 * | 10/2015 | Bailor | ................... | G06F 21/316 726/6 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

(Continued)

*Primary Examiner* — Kim Nguyen
(74) *Attorney, Agent, or Firm* — Ryan, Mason & Lewis, LLP (57) ABSTRACT

A first work package defining a data analytic plan associated with a given data problem is obtained. The first work package is generated in accordance with an automated data analytics lifecycle and is implemented in a provisioned system. A second work package defining a revised data analytic plan is obtained. A set of differences between the first work package and the second work package is determined. Cost and time parameters, associated with modifying the provisioned system to implement the set of differences between the first work package and the second work package, are computed. The set of differences and the computed cost and time parameters are presented. The provisioned system is automatically re-configured in accordance with at least a portion of the set of differences and based on the computed cost and time parameters.

20 Claims, 5 Drawing Sheets

(56) References Cited

OTHER PUBLICATIONS

U.S. Appl. No. 13/628,589 filed in the name of W.A. Pauley, Jr. et al. on Sep. 27, 2012 and entitled "Data Analytics Lifecycle Automation."

U.S. Appl. No. 13/923,791 filed in the name of Stephen Todd on Jun. 21, 2013 and entitled "Data Analytics Computing Resource Provisioning."

* cited by examiner

COMPUTING RESOURCE RE-PROVISIONING DURING DATA ANALYTIC LIFECYCLE

FIELD

The field relates to data analytics, and more particularly to techniques for re-provisioning computing resources for use in data analytics.

BACKGROUND

Data science typically refers to the science that incorporates various disciplines including, but not limited to, operations research, mathematics, statistics, computer science, and domain-specific expertise. A data scientist thus is one who practices some or all aspects of data science in attempting to solve complex data problems. Such complex data problems may, for example, come up in big data and cloud computing contexts.

A data science project typically runs through a data analytic lifecycle, which includes creation of hypotheses, collection of data, exploration of the data in an analytic "sandbox," and execution of analytic models across that data. A so-called "sandbox" is the computing resource environment associated with tasks such as data exploration. Typically, there are multiple stakeholder (actor) types involved with a data science project, e.g.: data scientist, data engineer, database administrator, project sponsor, project manager, business intelligence analyst, and business user. One or more of these actors are typically involved in the various stages of the data analytic lifecycle.

Conventional data analytics solutions are becoming more and more limited due to the increasing sizes and variety of data sets that such solutions are applied against. Such limitations include the lack of ability to adequately calculate the cost of the data analytics solution, including costs associated with computing resources and time consumption, particularly in a cloud computing environment. Still further, manual reconfiguration of cloud computing resources after initial provisioning of cloud computing resources can drastically alter the cost and/or time to conduct a data science experiment, as well as put at risk the accuracy of the analytic results.

SUMMARY

Embodiments of the invention provide techniques for re-provisioning computing resources for use in data analytics.

In one embodiment, a method comprises the following steps. A first work package defining a data analytic plan associated with a given data problem is obtained. The first work package is generated in accordance with an automated data analytics lifecycle and is implemented in a provisioned system. A second work package defining a revised data analytic plan associated with the given data problem is obtained. The second work package is also generated in accordance with the automated data analytics lifecycle. A set of differences between the first work package and the second work package is determined. Cost and time parameters, associated with modifying the provisioned system to implement the set of differences between the first work package and the second work package, are computed. The set of differences and the computed cost and time parameters are presented. The provisioned system is automatically re-configured in accordance with at least a portion of the set of differences and based on the computed cost and time parameters.

The method may also enable selection of one or more differences from the presented set of differences to be implemented and to cause the first provisioned system to be automatically re-configured (e.g., a user roll-forward technique).

In another embodiment, an article of manufacture is provided which comprises a processor-readable storage medium having encoded therein executable code of one or more software programs. The one or more software programs when executed by one or more processing elements of a computing system implement steps of the above-described method.

In yet another embodiment, an apparatus comprises a memory and a processor operatively coupled to the memory and configured to perform steps of the above-described method.

Advantageously, illustrative embodiments described herein provide re-provisioning techniques for use with data analytics solutions that substantially improve ease of use and efficiency by automatically considering time and cost for various proposed computing resource re-configurations, as well as automatically incorporating modifications of security and/or privacy policies into the various proposed computing resource re-configurations.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Further, as used herein, the term "provisioning" refers to the process(es) of generating and/or deploying one or more computing resources in a computing system, such as for example, in a cloud infrastructure environment, generating and deploying one or more virtual machines and logical storage units in a data center. Thus, "re-provisioning" refers to the process(es) of modifying or reconfiguring a previously provisioned computing system, and/or provisioning an entirely new computing system that differs in some specified manner from the previous computing system.

It is to be appreciated that prior to a detailed description of computing resource re-provisioning techniques according to embodiments of the invention, we will first describe, in Section I, an exemplary data analytics lifecycle automation system in which, and/or with which, the computing resource re-provisioning techniques can be implemented. Illustrative computing resource re-provisioning techniques will then be described below in Section II. However, it is to be further appreciated that the computing resource re-provisioning techniques may be alternatively implemented in a stand-alone system or in any other data analytics system in which it would be desirable to improve ease of use and efficiency of the system.

I. Exemplary Data Analytics Lifecycle Automation System

FIGS. 1A through 4 will be used to describe the exemplary data analytics lifecycle automation system. Further details of this exemplary system can be found in the U.S. patent application identified as Ser. No. 13/628,589, filed on Sep. 27, 2012, and entitled "Data Analytics Lifecycle Automation."

Figure 1A:
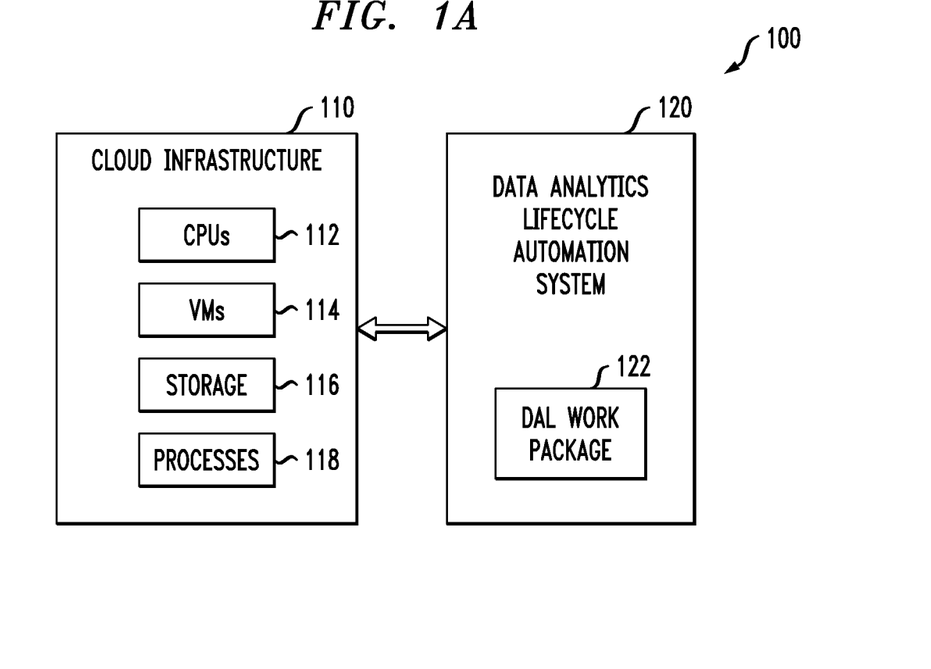
FIG. 1A illustrates cloud infrastructure and a data analytics lifecycle automation system, in accordance with one embodiment of the invention.

FIG. 1A shows a system 100 configured in accordance with an illustrative embodiment of the present invention. The system 100 comprises cloud infrastructure 110 and a data analytics lifecycle automation system 120.

As will be explained in detail below, the data analytics lifecycle automation system 120 enables a data scientist (or other actor) to automatically, yet still interactively, create a work package 122 that can be executed to solve one or more complex data problems. By "work package" it is meant a specific set of data and instructions that are used for analysis, preparation, and/or support of steps within a data analytic lifecycle (e.g., a data analytic plan) for solving the one or more complex data problems. System 120 accomplishes this, as will be explained in detail below, by providing processing elements that embody phases of a data analytics lifecycle (DAL) including, but not limited to, discovery, data preparation, model planning, model building, and operationalization of results.

Cloud infrastructure 110 is illustratively depicted in the figure as comprising an execution environment with execution components comprising one or more central processing units (CPUs) 112, one or more VMs 114, and storage devices 116 (upon which logical units (LUNs) are implemented) that execute one or more processes 118 that operate on one or more process input data sets that generate one or more process output data sets. Thus, the work package generated by system 120 can be operationalized using execution components (both physical and virtual computing resources) to form a provisioned system in the cloud infrastructure 110. A computing resource re-provisioning system and methodologies used to re-configure such execution components in the cloud infrastructure 110 will be described below in the context of FIG. 5.

Although system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the data analytics lifecycle automation system 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

Figure 1B:
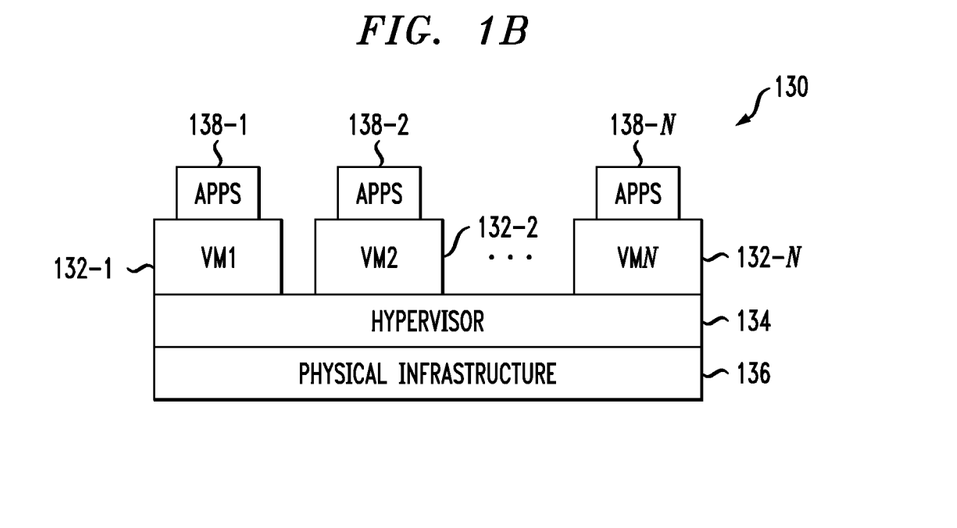
FIG. 1B illustrates a more detailed view of the cloud infrastructure of FIG. 1A.

As shown in FIG. 1B, the cloud infrastructure 130 (corresponding to 110 in FIG. 1A) comprises virtual machines (VMs) 132-1, 132-2, . . . 132-N implemented using a hypervisor 134. The hypervisor 134 is an example of what is more generally referred to herein as "virtualization infrastructure." The hypervisor 134 runs on physical infrastructure 136 (e.g., such as may include CPUs 112 and/or storage devices 116 in FIG. 1A). The cloud infrastructure 130 further comprises sets of applications 138-1, 138-2, . . . 138-N running on respective ones of the virtual machines 132-1, 132-2, . . . 132-N (utilizing associated LUNs or virtual disks) under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

An example of a commercially available hypervisor platform that may be used to implement portions of the cloud infrastructure 130 (110) in one or more embodiments of the invention is the VMware® vSphere™ which may have an associated virtual infrastructure management system such as the VMware® vCenter™. The underlying physical infrastructure 136 may comprise one or more distributed processing platforms that include storage products such as VNX® and Symmetrix® VMAX®, both commercially available from EMC Corporation of Hopkinton, Mass. A variety of other storage products may be utilized to implement at least a portion of the cloud infrastructure 130 (110).

Figure 2:
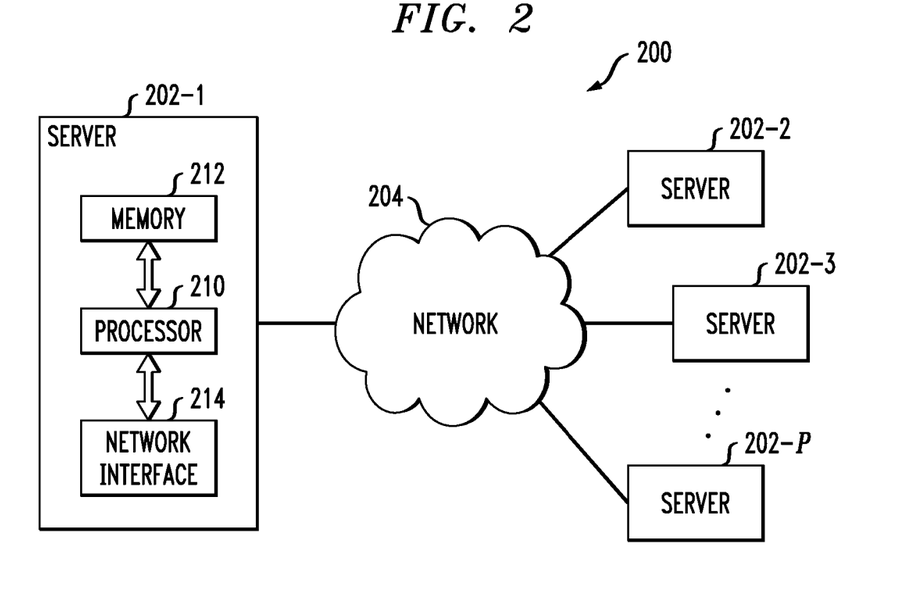
FIG. 2 illustrates a processing platform on which the cloud infrastructure and the data analytics lifecycle automation system of FIG. 1A are implemented, in accordance with one or more embodiments of the invention.

An example of a processing platform on which the cloud infrastructure 110 and/or the data analytics lifecycle automation system 120 of FIG. 1A may be implemented is processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements.

The memory 212 may be viewed as an example of what is more generally referred to herein as a processor-readable storage medium having encoded therein executable code of one or more software programs. Such a memory may comprise electronic memory such as random access memory (RAM), read-only memory (ROM) or other types of memory, in any combination. The program code when executed by a processing device such as the server 202-1 causes the device to perform functions associated with one or more of the elements of system 100. One skilled in the art would be readily able to implement such software given the teachings provided herein. Other examples of processor-readable storage media include, but are not limited to, optical disks and magnetic disks. Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 200 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Illustrative details of the data analytics lifecycle automation system 120 will now be described with reference to FIGS. 3 and 4.

It is to be understood that the spectrum of complex data problem types that the data analytics lifecycle automation system can be used to address is far reaching. By way of example only, the data scientist (as well as other actors in a data analytics lifecycle) is typically faced with the task of designing a data processing system that handles data associated with tasks such as, for example, a complex research project, a data mining project involving a very large amount of data (so-called "big data"), one or more applications that a customer entity wishes to be hosted by a service provider entity (e.g., in a data center environment), a business problem, etc. The common problem that a database administrator, a data engineer, or a data scientist faces with each of these complex data problem types is how to design and provision the computing environment (platform) that will be used for analysis and what data sets to include in the analysis. Part of the problem is also identifying the size and compute power needed for the analytic "sandbox," as will be described below, in which the data scientist will work and experiment with the data.

Figure 3:
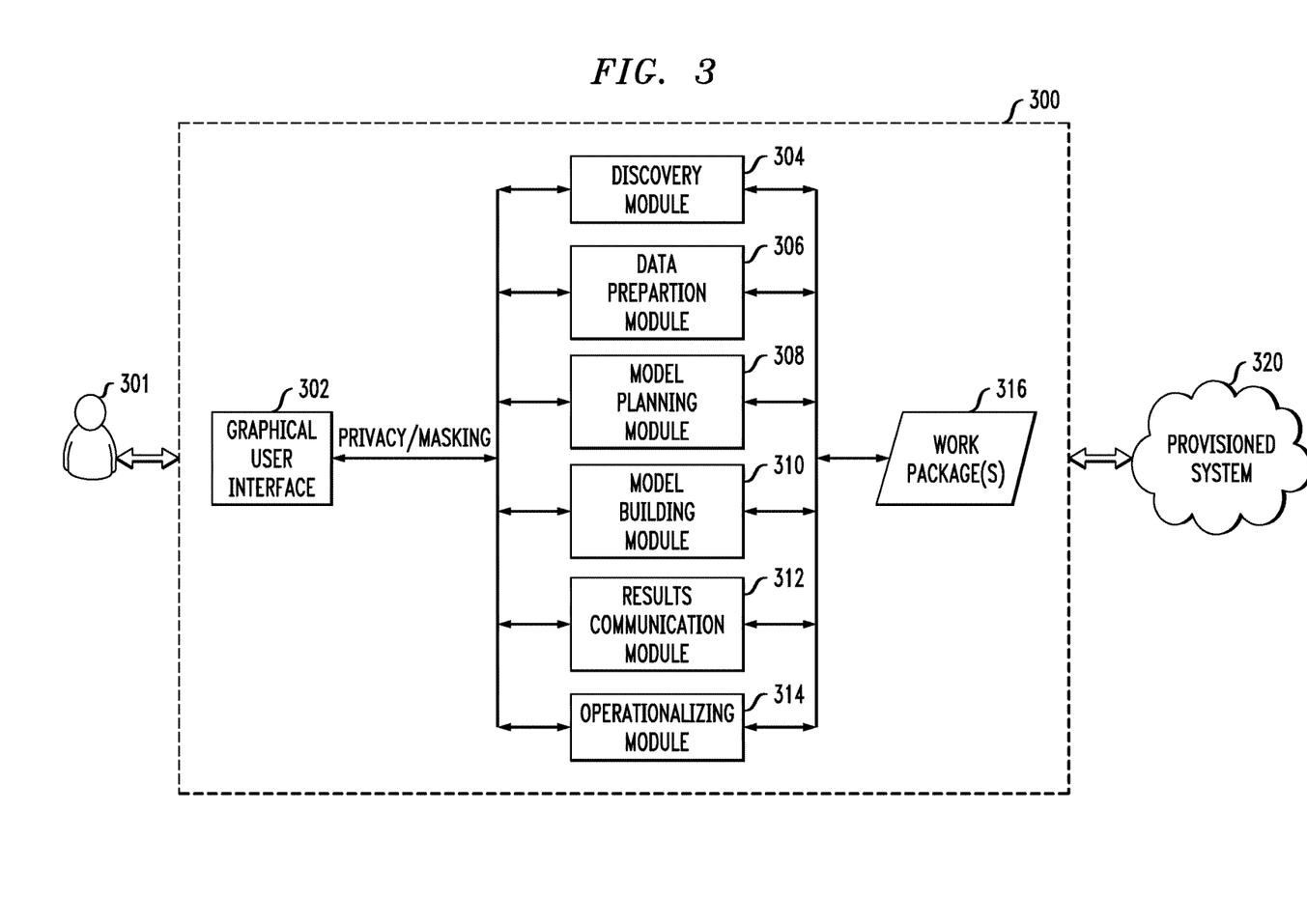
FIG. 3 illustrates a data analytics lifecycle automation system, in accordance with one embodiment of the invention.
Figure 4:
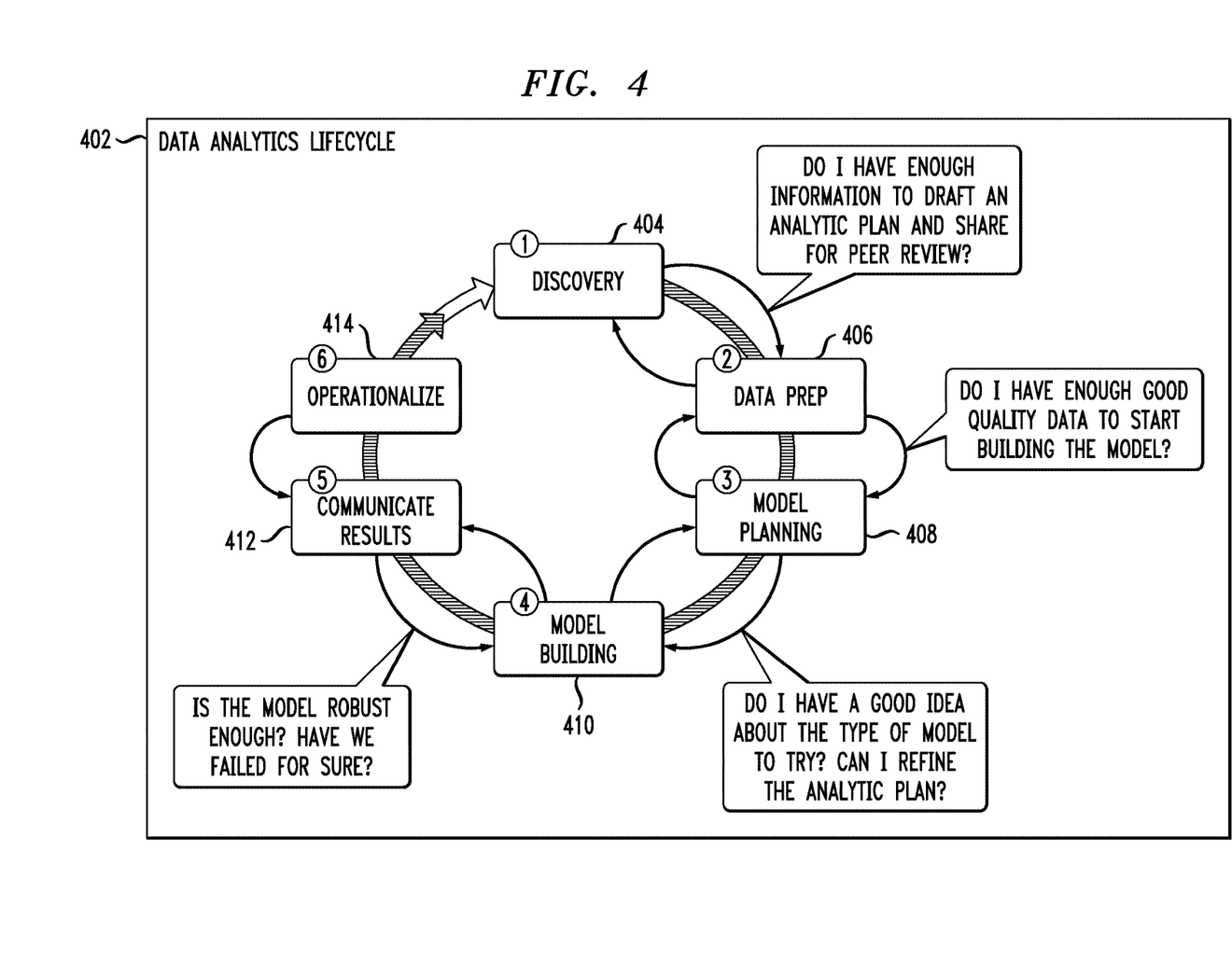
FIG. 4 illustrates a data analytics lifecycle automation methodology, in accordance with one embodiment of the invention.

FIG. 3 illustrates a system for assisting the data scientist, inter alia, to overcome the problems mentioned above. More particularly, FIG. 3 depicts a data analytics lifecycle automation system 300 (e.g., corresponding to system 120 of FIG. 1) that allows a data scientist 301 (or some other user or users, e.g., business user) to design and generate a provisioned system 320 that can be used to analyze and otherwise process data associated with a given complex data problem.

As shown, system 300 includes a graphical user interface 302, a discovery module 304, a data preparation module 306, a model planning module 308, a model building module 310, a results communication module 312, an operationalizing module 314, and one or more work packages 316. Note that the components of system 300 in FIG. 3 may be implemented on a single computing system, or one or more components of system 300 may be implemented in a distributed computing system, e.g., across multiple servers 202 in FIG. 2.

The graphical user interface (GUI) 302 is the interface(s) through which the data scientist 301 interacts (e.g., enters data, responses, queries to one or more modules, and receives data, results, and other output generated by one or more modules) with system 300. It is to be understood that the interface used to interact with system 300 does not necessarily have to be a graphical user interface, but rather could be through command lines or some other form of input/output. As such, embodiments of the invention are not limited to any particular form of user interface.

Note that the six modules of the system 300 respectively correspond to the phases of a data analytics lifecycle (DAL). FIG. 4 depicts the six phases of a DAL 402, according to one embodiment of the invention, including: a discovery phase 404, a data preparation phase 406, a model planning phase 408, a model building phase 410, a results communication phase 412, and an operationalizing phase 414. Each component of the system 300 assists the data scientist 301 in generating work package 316 that is used to provision the actual analytics system (provisioned system 320) that addresses the given complex data problem.

A description of each DAL phase will now be given with an exemplary problem for which the system 320 is being designed and provisioned. In this example, the problem is a business problem. More specifically, and by way of example only, the business problem is assumed to be the task of accelerating innovation in a global technology corporation. Three aspects of this problem may be: (a) the tracking of knowledge growth throughout the global employee base of the corporation; (b) ensuring that this knowledge is effectively transferred within the corporation; and (c) effectively converting this knowledge into corporate assets. Developing an analytics system (320 in FIG. 3) that executes on these three aspects more effectively should accelerate innovation, which will thus improve the viability of the corporation. Thus, the task of system 300 is to develop such an analytics system. Of course, it is to be understood that this corporate innovation acceleration problem is just one of a myriad of examples of complex data problems that system 300 using DAL 402 can be used to address.

Discovery Phase 404 (Performed by Module 304 in System 300).

In the discovery phase, the data scientist develops an initial analytic plan. The analytic plan lays the foundation for all of the work in the analytic project being developed to address the business problem. That is, the analytic plan assists the data scientist 301 in identifying the business problem, a set of hypotheses, the data set, and a preliminary plan for the creation of algorithms that can prove or disprove the hypotheses. By way of example only, in the corporate innovation acceleration problem mentioned above, one hypothesis identified by the user as part of the analytic plan may be that an increase in geographic knowledge transfer in a global corporation improves the speed of idea delivery. This hypothesis paves the way for what data will be needed and what type of analytic methods will likely need to be used.

Data Preparation Phase 406 (Performed by Module 306 in System 300).

As the arrows in DAL 402 indicate, the six phases are iterative and interrelated/interconnected, and as such, one phase can be returned to from one of the other phases in the process. Also, proceeding to the second phase (406) is often a matter of whether or not the data scientist is ready and comfortable sharing the analytic plan developed in the first phase (404) with his/her peers (this comfort level is reflective of the maturity of the analytic plan—if it is too rough and unformed, it will not be ready to be shared for peer review). If so, then the data preparation phase 406 can begin. That is, once the analytic plan has been delivered and socialized, the next step focuses on the data. In particular, the next step is about conditioning the data. The data must be in an acceptable shape, structure, and quality to enable the subsequent analysis.

Continuing with the corporate innovation acceleration example, assume that the type of data that the analytics project relies on falls into two categories: (i) an "idea submission" data set (essentially a large-scale database containing structured data); and (ii) a globally-distributed set of unstructured documents representing knowledge expansion within the corporation in the form of minutes and notes about innovation/research activities. It is realized that these data sets cannot be analyzed in their raw formats. In addition, it is possible that the data is not of sufficient quality. Furthermore, the data is likely inconsistent.

All of these issues suggest that a separate analytic "sandbox" must be created to run experiments on the data. The "sandbox" here refers to a separate analytics environment used to condition and experiment with the data. This sandbox is realized via data preparation module 306. On average the size of this sandbox should be roughly ten times the size of the data in question. As such, the sandbox preferably has: (i) large bandwidth and sufficient network connections; (ii) a sufficient amount of data including, but not limited to, summary data, structured/unstructured, raw data feeds, call logs, web logs, etc.; and (iii) transformations needed to assess data quality and derive statistically useful measures. Regarding transformations, it is preferred that module 306 transform the data after it is obtained, i.e., ELT (Extract, Load, Transform), as opposed to ETL (Extract, Transform, Load). However, the transformation paradigm can be ETLT (Extract, Transform, Load, Transform again), in order to attempt to encapsulate both approaches of ELT and ETL. In either the ELT or ETLT case, this allows analysts to choose to transform the data (to obtain conditioned data) or use the data in its raw form (the original data). Examples of transformation tools that can be available as part of data preparation module 306 include, but are not limited to, Hadoop™ (Apache Software Foundation) for analysis, Alpine Miner™ (Alpine Data Labs) for creating analytic workflows, and R transformations for many general purpose data transformations. Of course, a variety of other tools may be part of module 306.

It is further realized that once the sandbox is created, there are three key activities that allow a data scientist to conclude whether or not the data set(s) he/she is using is sufficient:

(i) Familiarization with the data. The data scientist 301 lists out all the data sources and determines whether key data is available or more information is needed. This can be done by referring back to the analytic plan developed in phase 404 to determine if one has what is needed, or if more data must be loaded into the sandbox.

(ii) Perform data conditioning. Clean and normalize the data. During this process, the data scientist 301 also discerns what to keep versus what to discard.

(iii) Survey and visualize the data. The data scientist 301 can create overviews, zoom and filter, get details, and begin to create descriptive statistics and evaluate data quality.

Model Planning Phase 408 (Performed by Module 308 in System 300).

Model planning represents the conversion of the business problem into a data definition and a potential analytic approach. A model contains the initial ideas on how to frame the business problem as an analytic challenge that can be solved quantitatively. There is a strong link between the hypotheses made in phase 404 (discovery phase) and the analytic techniques that will eventually be chosen. Model selection (part of the planning phase) can require iteration and overlap with phase 406 (data preparation). Multiple types of models are applicable to the same business problem. Selection of methods can also vary depending on the experience of the data scientist. In other cases, model selection is more strongly dictated by the problem set.

Described below are a few exemplary algorithms and approaches (but not an exhaustive list) that may be considered by the data scientist 301 in the exemplary accelerated corporate innovation hypothesis given above:

(i) Use Map/Reduce for extracting knowledge from unstructured documents. At the highest level, Map/Reduce imposes a structure on unstructured information by transforming the content into a series of key/value pairs. Map/Reduce can also be used to establish relationships between innovators/researchers discussing the knowledge.

(ii) Natural language processing (NLP) can extract "features" from documents, such as strategic research themes, and can store them into vectors.

(iii) After vectorization, several other techniques could be used:
   (a) Clustering (e.g., k-means clustering) can find clusters within the data (e.g., create 'k' types of themes from a set of documents).
   (b) Classification can be used to place documents into different categories (e.g., university visits, idea submission, internal design meeting).
   (c) Regression analysis can focus on the relationship between an outcome and its input variables, and answers the question of what happens when an independent variable changes. Regression analysis can help in predicting outcomes. This could suggest where to apply resources for a given set of ideas.

(d) Graph theory (e.g., social network analysis) is a way to establish relationships between employees who are submitting ideas and/or collaborating on research.

At this point in the DAL 402, the data scientist 301 has generated some hypotheses, described potential data sets, and chosen some potential models for proving or disproving the hypotheses.

Model Building Phase 410 (Performed by Module 310 in System 300).

In the model building phase, the system experimentally runs the one or more models that the data scientist 301 selected in phase 408. The model(s) may be executed on a portion of the original (raw) data, a portion of the conditioned data (transformed in phase 406), or some combination thereof. In this phase, the initial data analytic plan is updated to form a refined data analytic plan.

For example, Map/Reduce algorithm, NLP, clustering, classification, regression analysis and/or graph theory models are executed by module 310 on a test sample of the data identified and conditioned by module 306 in phase 406 (data preparation). Here the data scientist 301 is able to determine whether the models he/she selected are robust enough (which depends on the specific domain of the data problem being addressed) and whether he/she should return to the model planning phase 408. For example, in the corporate innovation acceleration example, some portion of the data sets identified in the earlier phases (e.g., structured idea submissions and unstructured support documents) is processed with the selected models.

Results Communication Phase 412 (Performed by Module 312 in System 300).

In the results communication phase, the results of the model execution of phase 410 are reported to the data scientist 301 (via GUI 302). This phase is also where the analytic plan that was initially developed in phase 404 and fine-tuned through phases 406, 408 and 410 can be output by the system 300 (i.e., as a refined or final analytic plan). The final analytic plan at this point in the DAL 402 may be referred to as a work package (316 in FIG. 3).

Operationalizing Phase 414 (Performed by Module 314 in System 300).

Operationalizing refers to the process of actually provisioning computing resources (physical and/or virtualized) to generate the system that will be deployed to handle the analytics project in accordance with the final analytic plan, e.g., system 320 in FIG. 3. This may involve provisioning VMs and LUNs as well as other virtual and physical assets that are part of cloud infrastructure 110 in FIG. 1. The provisioned system will then analyze subsequent data that is obtained for the given complex data problem.

One example of a cloud provisioning system and methodology that can be used as part of the operationalizing module 314 (or other module(s) of system 300), or used as a standalone system, is the system and methodology described in U.S. patent application identified as Ser. No. 13/923,791, filed on Jun. 21, 2013, and entitled "Data Analytics Computing Resource Provisioning." However, it is to be appreciated that alternative cloud provisioning system and methodology may be employed to generate the provisioned system 320.

Given the detailed description of the data analytics lifecycle phases above, we now make some observations and introduce some other features and advantages of the system.

Assume that the data scientist 301 is at a later phase in the process but then realizes that he/she forgot to include some data in the discovery phase 404 that is needed to complete the analysis. Advantageously, the interrelated and iterative nature of DAL 402 and the flexibility of the system used to automate the DAL (system 300) provide the data scientist with the ability to return to the discovery phase, correct the error, and return to a subsequent stage with the results for each stage affected by the change being automatically updated.

During the model building phase 410, it is not known what resources are going to be needed, which have a specific cost, and definition of what would be included (amount of storage, number of VMs, the analytics tools needed, etc.). Being able to know the approximate cost and configuration needed would be very useful for the process of tuning the model based on cost or configuration constraints. Thus, during each phase of the DAL 402, the data scientist 301 is presented (at GUI 301) with an inventory of the current infrastructure, services, and tools needed and their approximate cost as changes are made to the parameters associated with the analysis. This allows the data scientist to remove or change the model dynamically based on resource constraints (e.g., cost or VM limits).

Once the analytics work package 316 is defined, provisioning the resources needed to most efficiently support the analysis is important. As such, embodiments of the invention automate and execute work packages for the data scientist by constructing the work package and providing resource and cost estimates throughout the DAL.

Many times, introducing new raw, source data sets into a project can have cascading effects on the size of the analytic sandbox (see data preparation phase 406 above) needed to support the analysis. Embodiments of the invention provide selectable sizing multiples to dynamically provision the system parameters, such as a storage capacity, bandwidth required, and compute power depending on the type of new data involved and its size. For example, these sizing multiples could be used between phases 404 and 406, between 406 and 408, and even between phase 408 and 410. The sizing multiples serve as a mechanism for dynamically provisioning and adjusting the size, capacity, and constraints needed for the analytic sandbox.

By way of example only, assume there is 100 GB worth of innovation data that is to be analyzed. The data preparation module 306 multiplies this value by some constant (e.g., 10 or 20 times) in order to estimate the capacity of the analytic sandbox. That is, the data scientist will take the 100 GB of data and run transformations and other experiments that will require additional amounts of capacity. Therefore, the data preparation module 306 creates a work package specification that states: "allocate 1 TB of sandbox data which has the following features . . . ." This aspect of the work package instructs cloud provisioning software to allocate appropriately.

It is also realized that privacy of data is a major concern when mining large amounts or correlating various types of data. Privacy of the individuals needs to be protected while still allowing useful analysis and presentation of the data. Embodiments of the invention provide for masking capabilities in the work package 316, as well as any data presented by the system, for the data scientist, as well as creating contextual views based on the identity of the consumer of the output. This feature is very useful, particularly in a highly regulated data environment.

Further, the privacy/masking techniques associated with the work package 316 and other data can be employed to protect the data from wholesale viewing by the data scientist or an output generated by the work package execution. Also it is possible to create multiple views of the data based on privacy constraints tied to the context and role of the potential viewer. For example, a mid-level sales manager may have the ability to see consolidated data across the sales areas in the country, but his/her subordinates within the same area would only be allowed to see that specific area's data view as they are not authorized to see data across the country for regulatory (e.g., Security and Exchange Commission) reasons.

As a consequence of the privacy aspect, the data scientist can receive a diagnostic summary stating the resources they have access to for the analytical work they are planning to pursue.

While some illustrative privacy/masking techniques have been described above, it is to be understood that alternative privacy protection controls (such as, but not limited to, privacy anonymization) can be employed in system 300.

In addition, the operationalizing module 314 can make predictions of the types of additional technology resources and tools needed to complete the analytics and move into a production environment, based on the type of analytics being undertaken. As a result, the data scientist would be notified early if they needed to request additional tools that would enable them to complete their work. This aspect of system 300 enables the data scientist to initiate funding requests earlier in the DAL, identify people if specific skill sets are needed (such as a Hadoop™ expert in addition to a mathematician), and operationalize the resources before the data modeling stages (e.g., identify this during phase 404 of the DAL, rather than in phase 410) to avoid bottlenecks in the project.

It is further realized that a work package containing a larger sized data set will contribute to an increased cost, as provisioning will increase. Besides size, other data set characteristics may impact cost, e.g., perhaps publicly available data is cheaper than sensitive data, which requires an anonymization service. System 300 gives the data scientist insight into which data set characteristics would be most beneficial to the analytic plan.

Further, it is realized that the work of all data science projects are not equal. For example, a critical project such as one directed by an officer of the company (e.g., CEO) could require higher priority and take precedence over existing work packages. Also, perhaps the CEO's work package should be executed faster than regular data scientists, thus increasing provisioning. System 300 accounts for the priority levels associated with the data scientists.

Thus, an automated data analytics lifecycle system allows a data scientist to know ahead of execution time the execution costs. As will be further illustrated below, such a system can be configured to dynamically change system parameters as the data scientist begins to refine the data and the analysis without having to start all over again or manually de-provision or increase the provisioned resources. A dynamic work package can be created that includes the parameters needed to move through the analytics lifecycle and includes the automation necessary to allow the data scientist to focus on fine tuning the parameters and not on manually changing the infrastructure or data ingest process. Such automated re-provisioning of cloud resources can be accomplished via the computing resource re-provisioning system and methodology illustratively described in the next section in the context of FIG. 5.

II. Computing Resource Re-Provisioning System

We now turn to a description of computing resource re-provisioning according to one or more illustrative embodiments of the invention. Computing resource re-provisioning can be implemented in the operationalizing module 314 or any other module in system 300 (and combinations thereof) described above in Section I. Also, computing resource re-provisioning can alternatively be implemented as a module separate from the modules of system 300 shown in FIG. 3, e.g., as a computing resource re-provisioning module that resides between system 300, receiving a revised work package 316, and providing computing resource re-provisioning techniques so as to yield a re-provisioned system (i.e., modified version of provisioned system 320). One illustrative example of such a computer resource re-provisioning system or module will be described below in the context of FIG. 5.

Further, computing resource re-provisioning techniques as will be described herein can be implemented independent of and separate from system 300, and thus are not intended to be limited to any data analytics lifecycle automation system described herein. That is, the techniques may be implemented in a standalone computing resource re-provisioning system or in some other computing system that can benefit from advantages of computing resource re-provisioning.

As explained above in the context of FIGS. 1-4, a data science experiment runs through a lifecycle which includes the creation of hypotheses, the collection of data into an analytic sandbox, the exploration of the data, and the running of analytic models across that data. These steps require computing resources to be allocated, i.e., provisioned, examples of which are described above. However, while provisioning of an initial sandbox to be configured in the cloud for the commencement of analytic experimentation can be complex, automated modification of an existing sandbox and analytic environment is an even more complex problem that involves modifying or adding cloud resources while simultaneously removing or maintaining existing cloud resources. Illustrative embodiments of the invention provide systems and methodologies for automating the re-provisioning process.

Accordingly, it is realized here that as a data scientist or analytic project manager (or some other actor) goes through the phases of the data analytic lifecycle, knowledge is gained that requires (often significant) changes in the cloud computing resources required to conduct the experiment. In addition, cost and/or privacy requirements may fluctuate during this process, and it is desirable to avoid manual re-configuration. The re-provisioning methodologies described herein provide an approach to avoid manual re-configuration of analytic cloud computing resources associated with the data analytic lifecycle.

Manual re-configuration of cloud computing resources after the creation of an initial analytic sandbox can not only drastically alter the cost and/or time to conduct the experiment, but it can also destroy phases of work (e.g., cleansing/conditioning steps) as well as open up the data to unauthorized breaches and/or leakages. In addition, changing a sandbox environment can be a multi-step process where order matters, and atomicity of all steps should be guaranteed or else the data science experiment could result in failure or poor/erroneous analytic results.

By way of example, the data preparation phase (e.g., 406 in FIG. 4) may uncover a new, large database table(s) that needs to be added into the analytics sandbox. Manually provisioning a database (e.g., Pivotal Greenplum® database) alters the cost and time estimates for conducting the experiment, causing an over-budget and/or late result.

Observing slow response times during the model planning phase (e.g., 408) may result in the manual provisioning of a Flash tier or GemFire™ in-memory approach to speed analytic results, thus saving time to run the experiment. However, this manual provisioning can result in a more expensive analytic cost due to the new addition of an expensive Flash or memory tier. Furthermore, identification of this new need may come after someone has already defined and provisioned the cloud sandbox or workspace.

Further, during the model planning phase, the data scientist may realize that a different analytic model is more apt to provide good results. The manual loading of that new algorithm onto the existing cloud server infrastructure may result in a heavy load that overloads the server resources and lengthens the time to complete the analysis, or an underwhelmed CPU and/or memory utilization in which the data science team significantly overpays for cloud resources.

Still further, again during the model planning phase, the data scientist may realize that a Hadoop™ task would be more appropriate than the current technique, which could be based on a non-parallelized computing approach or traditional relational database management system. Performing a manual migration to a Hadoop-friendly cloud technology (e.g., Isilon®) is error-prone and can lead to permissions and/or leakages of data.

By way of another example, during any of the phases of the data analytics lifecycle, a team member may join/leave the team, and privacy policies need to be re-adjusted. Manually doing this is difficult and error-prone because, in the original lifecycle provisioning step, it was done in a completely automated fashion.

In addition to manual errors in re-provisioning in the context of the analytics lifecycle, there is no guarantee that the changes will not increase the cost or the length of the project. Without knowing this up front, the user may embark on a re-configuration that unknowingly causes these increases. This does not leave the option for: (a) asking the system to decrease one or more of these variables; or (b) giving the user enough data to decide that the project perhaps should be ended and the stakeholders should cut their losses to avoid cost overruns or continuing on projects with low likelihood of success.

Thus, to address these and other drawbacks associated with manual re-provisioning of cloud computing resources, illustrative embodiments of the invention provide a work package delta technique. For example, in one embodiment, the data scientist modifies the current work package (e.g., work package 316 in FIG. 3) to generate a new (revised) work package, while the system retains the current work package configuration. The new work package can be displayed to the user, and the deltas highlighted, along with the ramifications (e.g., more/less expensive, more/less time to complete). At this point, the data scientist can decide to roll-forward (or cancel) the configuration to best save money and/or meet schedule. Once the data scientist decides to "roll-forward" to a new work package, embodiments of the invention intelligently re-provision the cloud environment in a safe fashion that is atomic, roll-back friendly, and preserves privacy and security settings. In addition to configuration changes, migrations can also occur as a result of the modification of the work package, by way of example only, a Network Attached Storage (NAS) to a Hadoop™ Distributed File System (HDFS) conversion can occur.

Figure 5:
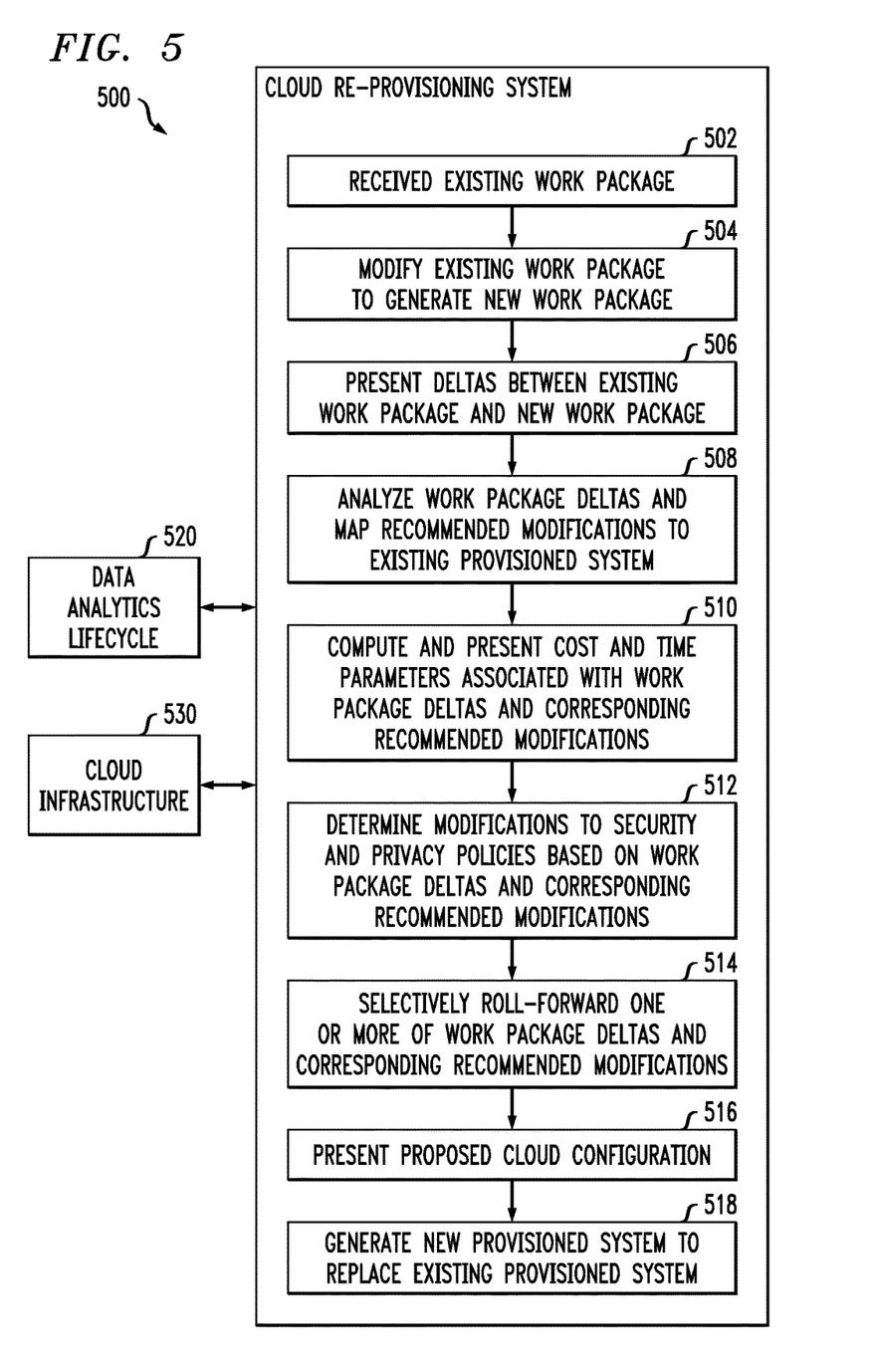
FIG. 5 illustrates a computing resource re-provisioning system and methodology, in accordance with one embodiment of the invention.

Thus, as illustratively depicted in FIG. 5, automated re-provisioning of cloud resources in the context of a data analytics lifecycle provides for monitoring, comparing and fine-tuning constraints in the work package as conditions change throughout the data analytics lifecycle process. In illustrative embodiments, privacy settings for a given user can be automatically added or removed, where that user has a certain role that maps to a specific part of the lifecycle, so as to maintain privacy during changes in the data analytics lifecycle process. Further, illustrative embodiments provide a mechanism for displaying the impact of a work package configuration change thus allowing a data scientist to consider the ramifications of the change (e.g., additional/reduced time, additional/reduced cost) and commit with confidence to a decision. Still further, committing to a new model may cause a migration to a new server class (e.g., more powerful CPU, more memory) that can be automatically recommended, in illustrative embodiments, based on the new model. Automated selection and use of a new storage tier (e.g., HDFS versus NAS) in accordance with illustrative embodiments removes the error-prone steps of manually reconfiguring the data analytic sandbox that typically would occur today.

FIG. 5 illustrates a computing resource re-provisioning system and methodology, in accordance with one embodiment of the invention. In particular, cloud re-provisioning system 500 depicts a workflow process comprising steps 502 through 518. The "user" here can be one or more of the stakeholder (actor) types involved with a data science project.

As illustratively shown in FIG. 5, the workflow process includes step 502 wherein the system 500 receives a work package (e.g., 316 in FIG. 3) from a data analytics lifecycle automation system (e.g., 300 in FIG. 3). It is to be appreciated that the work package is a result of execution of one or more phases of data analytics lifecycle 520, which is carried out with cloud resources available in cloud infrastructure 530.

In step 504, the system 500 modifies the existing work package to generate a new work package. Examples of such modifications, and reasons for their proposed implementation throughout the data analytics lifecycle 520, are described above and below (e.g., change in the scope of the data set(s) being evaluated causing a need to modify the analytic sandbox environment).

In step 506, the system 500 presents to the user deltas between the existing work package and the new work package. For example, the deltas can be highlighted to the user on a graphical user interface (e.g., 302 in FIG. 3). Examples of such deltas are described below.

In step 508, the system 500 analyzes the work package deltas and maps recommended modifications to the existing provisioned system. In particular, the system 500 accepts a description of modifications of analytics algorithms and/or data sets that will be used in the given data modeling experiment, and maps these items to the available memory, network, storage, and security capabilities available within the cloud, thus recommending an optimal re-configuration.

In step 510, the system 500 computes and presents to the user (e.g., GUI 302) an approximate cost within a given timeframe associated with the work package deltas and corresponding recommended modifications (i.e., the proposed re-configuration).

In step 512, the system 500 determines modifications to security and privacy policies based on the work package deltas and corresponding recommended modifications.

In step 514, the system 500 enables the user to selectively roll-forward one or more of the work package deltas and corresponding recommended modifications (i.e., both computing resource changes and security/privacy changes). That is, the system is configured to permit the user to approve all deltas/modifications at one time, approve individual deltas/ modifications, or approve some subset of deltas/modifications. For example, approval can be done through GUI 302.

In step 516, the system 500 presents (e.g., GUI 302) the proposed cloud configuration (re-configuration) to the user.

In step 518, the system 500 generates a new provisioned system to replace the existing provisioned system (e.g., 320 in FIG. 3) in the cloud infrastructure 530. By way of example, this may include adding or removing virtual computing resources (e.g., VMs, LUNs, etc.) to/from the provisioned system, and even migration to a new storage or processing platform. Then, the re-provisioned system is used to continue (or even restart) the subject data analytics project.

It is to be appreciated that not only are data processing and/or data storage resources re-provisioned in accordance with computing resource re-provisioning embodiments of the invention, but also network resources. By way of example only, there may be changes to bandwidth requirements for moving the data under analysis between storage and data processing resources, and this may involve the re-provisioning of a network (including resources of the network) to not only establish a new path for the move but also re-configuring minimum/maximum bandwidth requirements.

The following are some illustrative non-limiting examples using computing resource re-provisioning techniques according to one or more embodiments of the invention. By way of example only, the workflow process in system 500 of FIG. 5 may be configured to operate consistent with these and other examples. These examples highlight the changes that can occur to a work package and how the automated re-provisioning approach improves the chances for success of the overall project.

Example 1

During the data preparation phase, assume the data scientist realizes that one of the hypotheses is poorly written and perhaps cannot be accepted or rejected. The data scientist can edit the hypothesis list and create a new hypothesis list. Illustrative automated re-provisioning embodiments compare the old hypothesis list to the new hypothesis list, automatically perform privacy and data discovery steps, and describe the configuration differences that will be required, along with the time and cost estimates associated with the changes. The hypotheses differences and its effects on privacy settings, data discovery results and cloud configuration are displayed to the user as work package deltas.

Example 2

During the data modeling phase, assume the data scientist realizes that more data must be imported into the sandbox in order to prove the hypotheses or run the models. The data scientist returns to the data discovery phase and locates the required data. A new data set list is added to the delta work package, and then a comparison is run which compares the new data set to the old data set to determine what type of storage configuration should be allocated to the sandbox, and what are the costs associated with the change. This information is provided to the user and a decision can effectively be made.

Example 3

Assume that a database administrator leaves a given project. This person has access to database tables and file system permissions within the sandbox. At the same time a new data scientist is added to the team. These changes are reflected in the work package deltas, and with the approval of the overall project manager, the database administrator is safely removed from any phase two sandbox configuration, while the new data scientist is only given permission to execute modeling algorithms on the data in the sandbox. This is done in an automated fashion without manual intervention in accordance with automated re-provisioning techniques described herein.

Example 4

Assume that the model planning phase reveals that the model is not yielding the desired results and a different model must be chosen from the ontology of choices. This new model, when placed into the altered work package, will yield a recommended set of changes to the server/network/storage infrastructure in order to best run the algorithm. The change will result in additional/reduced costs and also change the length of time to run the work. In accordance with illustrative embodiments, these choices are presented to the user, and if approved, the new configuration is created and the model deployed.

Example 5

Assume that the analytic modeling phase is too slow. The user modifies the "time to run" requirements in the original work package and illustrative embodiments display what new configurations should be implemented to speed up the computation, and what the new, additional cost would be. These configurations can range from: (a) using new more powerful servers/memory; (b) using a new storage tier (e.g., flash); or (c) provisioning additional storage capacity for executing compute jobs (such as, for example, MapReduce) in a parallelized fashion.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. A method comprising:
obtaining a first work package defining an initial data analytic plan associated with a given data problem, the first work package being generated in accordance with an automated data analytics lifecycle and being implemented in a provisioned system;
obtaining a second work package defining a revised data analytic plan associated with the given data problem, the second work package being generated in accordance with the automated data analytics lifecycle;
wherein the first work package and the second work package are each obtained as a result of an execution of one or more phases of the automated data analytics lifecycle, the one or more phases comprising a discov- ery phase to develop the initial data analytic plan and the revised data analytic plan, and an operationalizing phase to generate the provisioned system by provisioning one or more computing resources;

determining a set of differences between the first work package and the second work package;

computing cost and time parameters associated with modifying the provisioned system to implement the set of differences between the first work package and the second work package;

presenting the set of differences and the computed cost and time parameters; and causing the provisioned system to be automatically re-configured during the operationalizing phase of the data analytics lifecycle in accordance with at least a portion of the set of differences and based on the computed cost and time parameters;

wherein the above steps are performed on one or more processing elements associated with a computing system.

2. The method of claim 1, further comprising enabling selection of one or more differences from the presented set of differences to be implemented and to cause the first provisioned system to be automatically re-configured.

3. The method of claim 1, wherein the set of differences comprises one or more changes to computing resources deployed as part of the first provisioned system.

4. The method of claim 1, wherein the set of differences comprises one or more changes to a security policy applied in the first provisioned system.

5. The method of claim 1, wherein the set of differences comprises one or more changes to a privacy policy applied in the first provisioned system.

6. The method of claim 1, wherein the set of differences comprises a migration to an alternate processing platform.

7. The method of claim 1, wherein the set of differences comprises a migration to an alternate storage platform.

8. The method of claim 1, wherein the revised work package comprises a change to a hypothesis in the data analytic plan associated with the given data problem, and the provisioned system is automatically re-configured to implement the change to the hypothesis.

9. The method of claim 1, wherein the revised work package comprises a change to a data set in the data analytic plan associated with the given data problem, and the provisioned system is automatically re-configured to implement the change to the data set.

10. The method of claim 9, wherein the provisioned system is automatically re-configured to modify an analytic sandbox computing environment used to assist in solving the given data problem.

11. The method of claim 1, wherein the revised work package comprises a change to an analytic model in the data analytic plan associated with the given data problem, and the provisioned system is automatically re-configured to implement the change to the analytic model.

12. The method of claim 1, wherein the revised work package comprises a change to an access status of one or more participants in the data analytic plan associated with the given data problem, and the provisioned system is automatically re-configured to implement the change to the access status of the one or more participants.

13. An article of manufacture comprising a processor-readable storage medium having encoded therein executable code of one or more software programs, wherein the one or more software programs when executed by the one or more processing elements of the computing system implement the method of:

obtaining a first work package defining an initial data analytic plan associated with a given data problem, the first work package being generated in accordance with an automated data analytics lifecycle and being implemented in a provisioned system;

obtaining a second work package defining a revised data analytic plan associated with the given data problem, the second work package being generated in accordance with the automated data analytics lifecycle;

wherein the first work package and the second work package are each obtained as a result of an execution of one or more phases of the automated data analytics lifecycle, the one or more phases comprising a discovery phase to develop the initial data analytic plan and the revised data analytic plan, and an operationalizing phase to generate the provisioned system by provisioning one or more computing resources;

determining a set of differences between the first work package and the second work package;

computing cost and time parameters associated with modifying the provisioned system to implement the set of differences between the first work package and the second work package;

presenting the set of differences and the computed cost and time parameters; and causing the provisioned system to be automatically re-configured during the operationalizing phase of the data analytics lifecycle in accordance with at least a portion of the set of differences and based on the computed cost and time parameters;

wherein the above steps are performed on one or more processing elements associated with a computing system.

14. An apparatus comprising:

a memory; and at least one processor operatively coupled to the memory and configured to:

obtain a first work package defining an initial data analytic plan associated with a given data problem, the first work package being generated in accordance with an automated data analytics lifecycle and being implemented in a provisioned system;

obtain a second work package defining a revised data analytic plan associated with the given data problem, the second work package being generated in accordance with the automated data analytics lifecycle;

wherein the first work package and the second work package are each obtained as a result of an execution of one or more phases of the automated data analytics lifecycle, the one or more phases comprising a discovery phase to develop the initial data analytic plan and the revised data analytic plan, and an operationalizing phase to generate the provisioned system by provisioning one or more computing resources;

determine a set of differences between the first work package and the second work package;

compute cost and time parameters associated with modifying the provisioned system to implement the set of differences between the first work package and the second work package;

present the set of differences and the computed cost and time parameters; and cause the provisioned system to be automatically re-configured during the operationalizing phase of the automated data analytics lifecycle in accordance with at least a portion of the set of differences and based on the computed cost and time parameters.

15. The apparatus of claim 14, wherein the at least one processor is further configured to enable selection of one or more differences from the presented set of differences to be implemented and to cause the first provisioned system to be automatically re-configured.

16. The apparatus of claim 14, wherein the set of differences comprises one or more changes to computing resources deployed as part of the first provisioned system.

17. The apparatus of claim 14, wherein the set of differences comprises one or more changes to at least one of a security policy and a privacy policy applied in the first provisioned system.

18. The apparatus of claim 14, wherein the set of differences comprises a migration to at least one of an alternate processing platform and an alternate storage platform.

19. The apparatus of claim 14, wherein the revised work package comprises a change to a hypothesis in the data analytic plan associated with the given data problem, and the provisioned system is automatically re-configured to implement the change to the hypothesis.

20. The apparatus of claim 14, wherein the revised work package comprises a change to a data set in the data analytic plan associated with the given data problem, and the provisioned system is automatically re-configured to implement the change to the data set.

* * * * *